(12) United States Patent
Mühlfeld et al.

(10) Patent No.: US 12,352,354 B2
(45) Date of Patent: Jul. 8, 2025

(54) METHOD AND CONTROL UNIT FOR OPERATING A PARKING LOCK SYSTEM

(71) Applicant: ZF Friedrichshafen AG, Friedrichshafen (DE)

(72) Inventors: Florian Mühlfeld, Kürnach (DE); Matthias Müller, Haßfurt (DE); Pierre Mesnier, Röthlein (DE); Ramazan Uzunkaya, Bergrheinfeld (DE); Ulrich Quell, Fulda (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/748,385

(22) Filed: May 19, 2022

(65) Prior Publication Data
US 2022/0373083 A1 Nov. 24, 2022

(30) Foreign Application Priority Data
May 20, 2021 (DE) .......................... 102021205148.0

(51) Int. Cl.
*F16H 63/34* (2006.01)
*F16H 63/48* (2006.01)

(52) U.S. Cl.
CPC ......... *F16H 63/3425* (2013.01); *F16H 63/48* (2013.01)

(58) Field of Classification Search
CPC ................ B60T 1/005; F16H 61/22–2061/223
See application file for complete search history.

(56) References Cited

U.S. PATENT DOCUMENTS

| 7,698,042 B2* | 4/2010 | Shimizu | F16H 63/483 477/17 |
| 10,161,519 B2* | 12/2018 | Hamaya | F16D 63/006 |
| 10,378,600 B2* | 8/2019 | Tsukamoto | B60T 1/062 |

(Continued)

FOREIGN PATENT DOCUMENTS

| DE | 1062223 A | 7/1959 |
| DE | 19804640 A1 | 8/1999 |

(Continued)

OTHER PUBLICATIONS

German Search Report DE 10 2021 205 148.0, dated Dec. 16, 2021. (10 pages).

*Primary Examiner* — James J Taylor, II
(74) *Attorney, Agent, or Firm* — Dority & Manning, P.A.

(57) ABSTRACT

A method for operating a parking lock system (10) with a parking interlock gear (11) is provided. The parking lock system (10) also includes a parking pawl (12) insertable with an insertion section (20) in one of recesses (16) of the parking interlock gear (11) in order to interlock the parking interlock gear (11), a parking lock actuator (13) for the parking pawl (12), and a parking lock sensor (14) for detecting an absolute rotation angle position of the parking interlock gear (11). The method includes detecting an absolute rotation angle position of the parking interlock gear (11) and comparing the detected absolute rotation angle position with a reference rotation angle position. When the particular absolute rotation angle position is situated behind the reference rotation angle position as viewed in the particular direction of rotation of the parking interlock gear (11), a rattling process of the parking pawl (12) is detected.

8 Claims, 2 Drawing Sheets

(56) References Cited

U.S. PATENT DOCUMENTS

| | | | |
|---|---|---|---|
| 10,527,159 B2 * | 1/2020 | Takeuchi | B60L 7/18 |
| 10,816,093 B2 * | 10/2020 | Sugiyama | F16D 63/006 |
| 10,823,286 B2 | 11/2020 | Schlosser et al. | |
| 2020/0332892 A1 | 10/2020 | Kehr | |
| 2023/0074092 A1 * | 3/2023 | Vasanadu | F16H 59/68 |

FOREIGN PATENT DOCUMENTS

| | | |
|---|---|---|
| DE | 102015208594 A1 | 11/2016 |
| DE | 102015213612 A1 | 1/2017 |
| DE | 102018202370 A1 | 8/2019 |
| DE | 102019205608 A1 | 10/2020 |

* cited by examiner

METHOD AND CONTROL UNIT FOR OPERATING A PARKING LOCK SYSTEM

CROSS-REFERENCE TO RELATED APPLICATION

The present application claims priority to DE 102021205148.0 filed in the German Patent Office on May 20, 2021, which is incorporated by reference in its entirety for all purposes.

FIELD OF THE INVENTION

The invention relates generally to a method for operating a parking lock system of a motor vehicle. Moreover, the invention relates generally to a control unit for carrying out the method.

BACKGROUND

It is known from practical experience to secure a motor vehicle at a standstill against inadvertently rolling away via a parking lock system, which is typically an integral part of a transmission of the motor vehicle. A parking lock system provides a mechanical interlock of the drive train of the motor vehicle. Due to this mechanical interlock, a shaft coupled to the drive output of the motor vehicle and, thus, the drive output, are interlocked and, in this way, a rotation of this shaft and of the drive output is prevented such that the motor vehicle is secured against rolling away.

A parking lock system typically includes a parking pawl and a parking interlock gear. The parking pawl interacts with the parking interlock gear to mechanically interlock the drive train such that, for the case in which the parking pawl engages into the parking interlock gear, which is connected to the shaft coupled to the drive output of the motor vehicle, the parking lock system is engaged and the shaft and, thus, the drive output are interlocked.

A parking lock system typically also includes a parking lock actuator and a parking lock sensor. The parking lock actuator is utilized for actuating the parking pawl in order to engage or disengage the parking lock via the actuation of the parking pawl. A state of the parking lock can be detected via the parking lock sensor.

Moreover, a parking lock system can include a parking lock detent. The parking lock detent is utilized for locking and releasing the parking lock actuator. If a parking lock actuator is locked via the parking lock detent, the parking pawl cannot be actuated.

DE 10 2018 202 370 A1 and DE 10 2019 205 608 A1 both disclose details of parking lock systems of motor vehicles.

From DE 10 2019 205 608 A1, it is known that multiple recesses are distributed over the circumference of a parking interlock gear of a parking lock system. Teeth are formed between the recesses. Each of the recesses is delimited by a side situated at the front or leading as viewed in a particular direction of rotation of the parking interlock gear and a side situated at the rear or trailing as viewed in the direction of rotation.

From DE 10 62 223 A1, it is known to detect, by measurement, an absolute rotation angle position of a rotating component by a sensor. Such a detection of an absolute rotation angle position of a rotating component can be utilized in a parking lock system.

For the case in which a parking pawl is actuated in order to engage the parking lock system, the parking pawl can properly engage, with an insertion section, into a recess of the parking interlock gear and, thus, engage the parking lock system, only for the case in which the rotational speed of the parking interlock gear is lower than a limit value. If the rotational speed of the parking interlock gear is too great when the parking pawl has been actuated in order to engage the parking lock system, a rattling process of the parking pawl can arise.

From both DE 10 2015 213 612 A1 and DE 10 2015 208 594 A1, it is known to monitor a parking lock system for a rattling of the parking pawl.

Previously known methods for detecting a rattling process of a parking pawl of a parking lock system have the disadvantage that these methods are susceptible to error. In particular in the case of drive train vibrations, a rattling process can be detected even though a rattling process is not actually present. There is a need to increase the reliability of the detection of a rattling process of the parking pawl of a parking lock system.

SUMMARY OF THE INVENTION

Example aspects of the invention provide a method and control unit for operating a parking lock system.

In order to detect a rattling process of the parking pawl, an absolute rotation angle position of the parking interlock gear is detected and compared with a reference rotation angle position, wherein, for the case in which the particular absolute rotation angle position is greater than the reference rotation angle position, the presence of a rattling process of the parking pawl is detected. In this case, greater means that the particular absolute rotation angle position is situated behind the reference rotation angle position as viewed in the particular direction of rotation of the parking interlock gear.

The method according to example aspects of the invention permits a reliable detection of rattling processes in a parking lock system. In particular, the situation can be avoided in which, in the case of drive train vibrations, a rattling process is detected even though a rattling process is not actually present.

Preferably, the reference rotation angle position corresponds to that next rotation angle position of the parking interlock gear—in the particular direction of rotation of the parking interlock gear—at which one side, preferably a front side—as viewed in the particular direction of rotation of the parking interlock gear—of the insertion section of the parking pawl can rest against a corresponding side, preferably against a rear side—as viewed in the particular direction of rotation of the parking interlock gear—of a next recess of the parking interlock gear in the particular direction of rotation. This is particularly preferred in order to reliably detect a rattling process.

Preferably, the following steps are carried out to detect the rattling process of the parking pawl of the parking lock system:

Actuate the parking pawl of the parking lock system in order to engage the parking lock system.

Detect a first absolute rotation angle position of the parking interlock gear of the parking lock system when the insertion section of the parking pawl is insertable, in principle, into one of the recesses of the parking interlock gear on its own or exclusively as a result of the actuation of the parking pawl in order to engage the parking lock system.

Subsequently, also detect at least one second absolute rotation angle position of the parking interlock gear.

Compare the particular second absolute rotation angle position of the parking interlock gear with a reference rotation angle position, which, relative to the first absolute rotation angle position as viewed in the particular direction of rotation of the parking interlock gear, corresponds to that next rotation angle position of the parking interlock gear—in the particular direction of rotation—at which a side of the insertion section of the parking pawl situated at the front—in the particular direction of rotation of the parking interlock gear—can rest against a side of one of the recesses of the parking interlock gear situated at the rear in the particular direction of rotation of the parking interlock gear, wherein, for the case in which the particular second absolute rotation angle position is greater than the reference rotation angle position, the presence of a rattling process of the parking pawl is detected. In this case, greater means that the particular second absolute rotation angle position is situated behind the reference rotation angle position as viewed in the particular direction of rotation of the parking interlock gear.

This refinement is preferred in order to reliably detect a rattling process of a parking lock system.

BRIEF DESCRIPTION OF THE DRAWINGS

Exemplary embodiments of the invention are explained in greater detail with reference to the drawing, without being limited thereto, in which.

DETAILED DESCRIPTION

Figure 1:
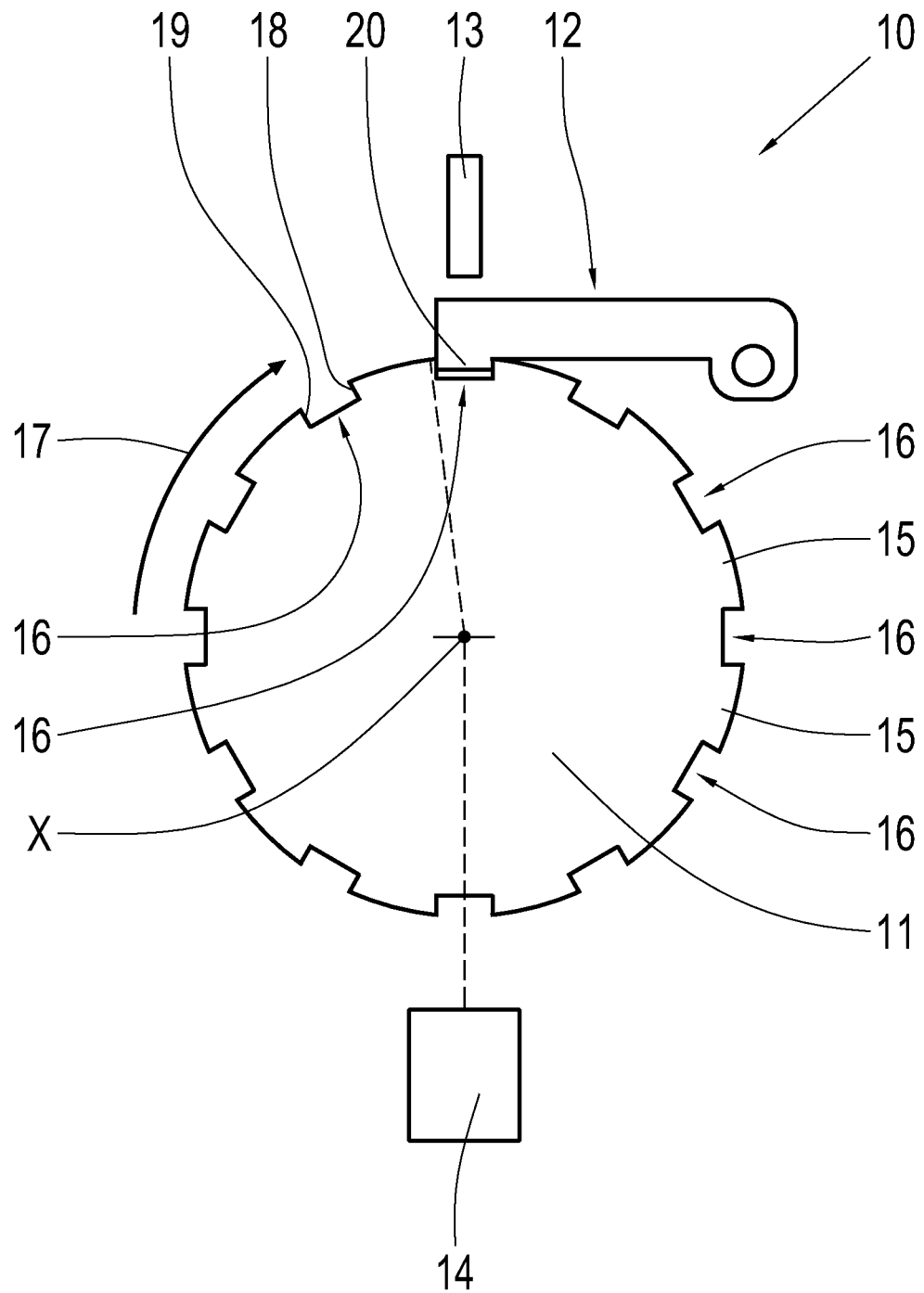
FIG. 1 shows a detail of a parking lock system of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Example aspects of the invention relate to a method and to a control unit for operating a parking lock system of a motor vehicle. Such a parking lock system is typically an integral part of a transmission of the motor vehicle.

FIG. 1 shows, in a highly schematic manner, assemblies of a parking lock system 10, namely a parking interlock gear 11, a parking pawl 12, a parking lock actuator 13, and a parking lock sensor 14.

The parking interlock gear 11 of the parking lock system 10 has multiple recesses 16 distributed over a circumference of the parking interlock gear 11. One tooth 15 is formed between each pair of recesses 16. The parking interlock gear 11 is rotatable about an axis of rotation X, wherein the arrow 17 in FIG. 1 illustrates one possible direction of rotation of the parking interlock gear 11. The parking interlock gear 11 is also rotatable in an opposite direction.

Each of the recesses 16 is delimited by sides, namely, on the one hand, by a side 18 of the particular recess 16 situated at the front or leading as viewed in the particular direction of rotation 17 of the parking interlock gear 11 and by a side 19 of the particular recess 16 situated at the rear or trailing as viewed in the particular direction of rotation 17 of the parking interlock gear 11. The front and rear sides 18, 19 are interchanged in the direction of rotation opposite the direction of rotation shown in FIG. 1.

The parking pawl 12 interacts with the parking interlock gear 11, wherein an insertion section 20 of the parking pawl 12 is insertable into one of the recesses 16 of the parking interlock gear 11 in order to interlock the parking interlock gear 11 and, thus, to engage the parking lock system 10.

The parking pawl 12 can be actuated via the parking lock actuator 13 in order to control the parking pawl 12 such that the parking pawl 12 can be inserted into a recess 16.

An absolute rotation angle position of the parking interlock gear 11 can be detected via the parking lock sensor 14.

As mentioned above, the recesses 16, which are delimited by the sides 18, 19, are distributed over the circumference of the parking interlock gear 11. A defined absolute rotation angle position over the circumference of the parking interlock gear 11 can be associated with each of these sides 18, 19 of the recesses 16.

This is shown, by way of example, in FIG. 1 for the side 19 situated at the rear or trailing as viewed in the direction of rotation 17 in FIG. 1 of that recess 16 into which, in FIG. 1, the insertion section 20 of the parking pawl 12 of the parking lock system 10 is inserted.

Depending on the circumferential width of the recesses 16, the circumferential width of the insertion section 20 and the position of the parking pawl 12, moreover, an absolute rotation angle position can be predefined—for each of the sides 18, 19 of each recess 16 of the parking interlock gear 11 depending on the particular direction of rotation of the parking interlock gear 11—in which or at which one side of the insertion section 20 of the parking pawl 12 contacts or touches or rests against a corresponding side 18, 19 of a particular recess 16 of the parking interlock gear 11.

Example aspects of the invention now relates to reliably detecting a rattling process of the parking pawl 12 at the parking interlock gear 11. In order to detect a rattling process of the parking pawl 12, an absolute rotation angle position of the parking interlock gear 11 is detected and, in fact, by the parking lock sensor 14, wherein this absolute detected rotation angle position is compared with a reference rotation angle position.

For the case in which the particular absolute rotation angle position is greater than the reference rotation angle position, the presence of a rattling process of the parking pawl 11 is detected. In this case, greater means that the particular absolute rotation angle position is situated behind the reference rotation angle position as viewed in the particular direction of rotation of the parking interlock gear 11.

This reference rotation angle position preferably corresponds to a next rotation angle position of the parking interlock gear 11—as viewed in the particular direction of rotation of the parking interlock gear 11—at which one side of the insertion section 12, namely a front side—as viewed in the particular direction of rotation of the parking interlock gear 11—of the insertion section 20 of the parking pawl 12 rests against a corresponding side, namely a rear side—as viewed in the particular direction of rotation of the parking interlock gear 11—of one of the recesses 16 of the parking interlock gear 11.

Figure 2:
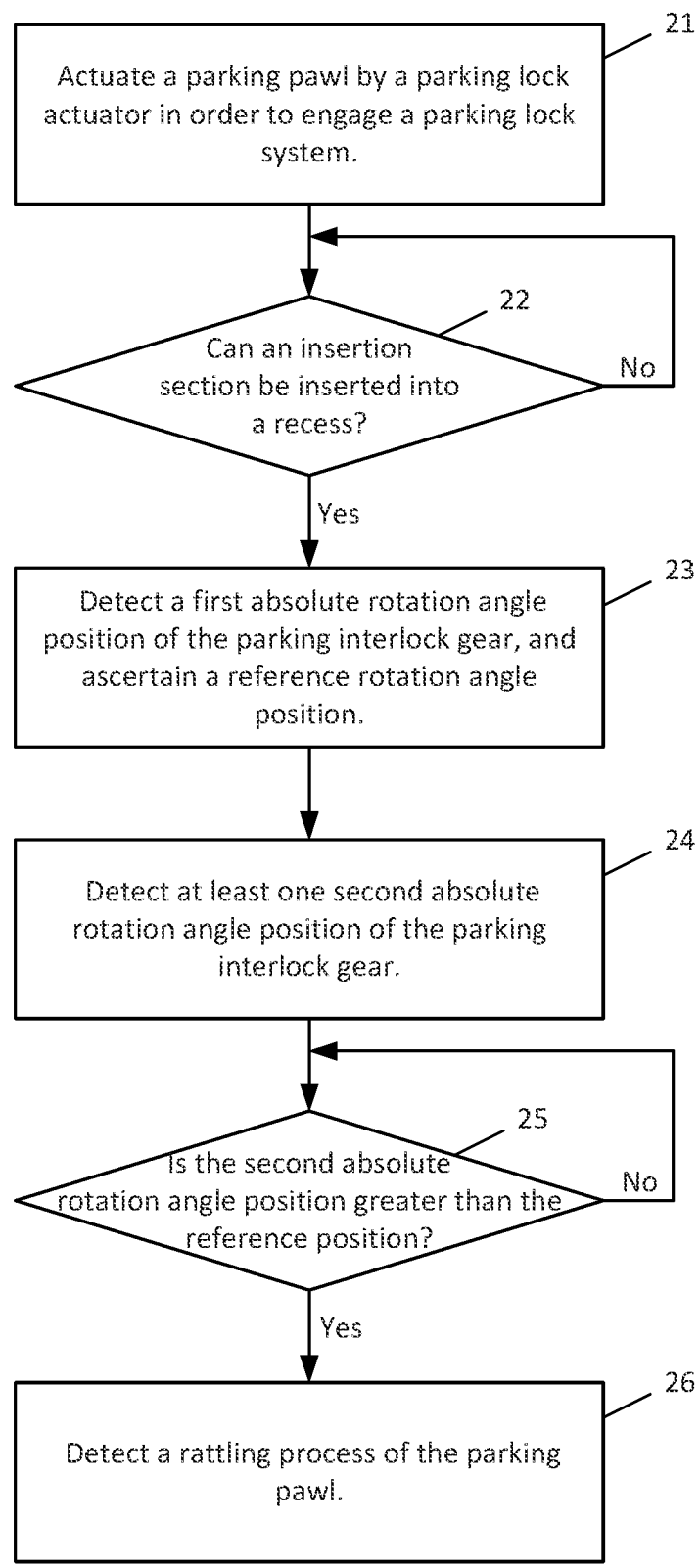
FIG. 2 shows a signal flowchart for illustrating example aspects of the invention.

Further details of example aspects of the invention are described in the following with reference to the signal flowchart from FIG. 2. In one block 21 of the signal flowchart from FIG. 2, the parking pawl 12 is actuated by the parking lock actuator 13 in order to engage the parking lock system 11.

In a subsequent step 22, a check is carried out to determine whether the insertion section 20 of the parking pawl 12 can be inserted, in principle, into one of the recesses 16 of the parking interlock gear 11 on its own or exclusively due to this actuation of the parking pawl 12. This is the case when the actuator 13 has sufficiently actuated the parking pawl 12 and, in fact, regardless of the position of the parking interlock gear 11, i.e., also for the case in which the insertion section 20 contacts a tooth 15 of the parking interlock gear 11.

If it is established in block 22 that the parking pawl 12 is not yet insertable, via the insertion section 20, into one of the recesses 16 of the parking interlock gear 11 on its own or exclusively due to the actuation of the parking pawl 12, the process branches from block 22 back to block 22. However, for the case in which it is established in block 22 that the insertion section 20 of the parking pawl 12 can be inserted, in principle, into one of the recesses 16 of the parking interlock gear 11 on its own or exclusively due to the actuation of the parking pawl 12, the process branches off to step 23.

In step 23, a first absolute rotation angle position of the parking interlock gear 11 is detected.

This first absolute rotation angle position of the parking interlock gear 11 is the rotation angle position of the parking interlock gear 11 that the parking interlock gear 11 assumes when the insertion section 20 of the parking pawl 12 is insertable, in principle, into one of the recesses 16 of the parking interlock gear 11 on its own or exclusively due to the actuation of the parking pawl 12 in order to engage the parking lock system 11.

This first absolute rotation angle position is stored, wherein a reference rotation angle position is ascertained depending on this first absolute rotation angle position and the direction of rotation of the parking interlock gear.

The ascertainment of the reference rotation angle position is also carried out in step 23, wherein this reference rotation angle position, relative to the first rotation angle position as viewed in the particular direction of rotation of the parking interlock gear 11, corresponds to that next rotation angle position of the parking interlock gear 11—in the particular direction of rotation of the parking interlock gear 11—at which a side of the insertion section 20 of the parking pawl 12 situated at the front in the particular direction of rotation of the parking interlock gear 11 can rest against the particular side 19 of one of the recesses 16 of the parking interlock gear 11 situated at the rear in the particular direction of rotation of the parking interlock gear 11.

Subsequently, in a step 24, one further detection of at least one second absolute rotation angle position of the parking interlock gear 11 is carried out with the parking lock sensor 14, wherein a check is carried out in a subsequent step 25 to determine whether the particular ascertained second absolute rotation angle position is greater than the reference rotation angle position ascertained depending on the first absolute rotation angle position.

In this case, greater means that the particular second absolute rotation angle position is situated behind the reference rotation angle position as viewed in the particular direction of rotation of the parking interlock gear 11.

If this is not the case, the process branches from block 25 back to block 24.

However, if it is established in block 25 that the particular ascertained second absolute rotation angle position is situated behind the reference rotation angle position as viewed in the particular direction of rotation of the parking interlock gear 11, the process branches from block 25 to block 26, wherein, in block 26, a rattling process of the parking pawl 12 is then detected.

Example aspects of invention also relate to a control unit of a motor vehicle, which is configured for carrying out the above-described method on the control side. The control unit according to example aspects of the invention is preferably the control unit that actuates the parking lock of the motor vehicle, i.e., for example, a transmission control unit of a transmission of the motor vehicle including the parking lock or an electronic control unit of an electric motor-driven drive axle of the motor vehicle including the parking lock. The control unit according to example aspects of the invention is configured for detecting an absolute rotation angle position of the parking interlock gear by the parking lock sensor 14 and comparing this absolute rotation angle position of the parking interlock gear with a reference rotation angle position. For the case in which the control unit recognizes that the particular detected absolute rotation angle position is situated behind the reference rotation angle position as viewed in the particular direction of rotation of the parking interlock gear 11, the control unit detects the presence of a rattling process of the parking pawl 12 and, in fact, as described in detail above.

The control unit is preferably an electronic control unit, which includes hardware and software for carrying out the method according to example aspects of the invention. The hardware include data interfaces for exchanging data with the assemblies contributing to the execution of the method according to example aspects of the invention, such as with the parking lock sensor 14. The hardware also encompass a processor for data processing and a memory for data storage. The software includes program modules, which are implemented for carrying out the method according to example aspects of the invention in the control unit.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 10 parking lock system
11 parking interlock gear
12 parking pawl
13 parking lock actuator
14 parking lock sensor
15 tooth
16 recess
17 direction of rotation
18 side
19 side
20 insertion section
21 step
22 step
23 step
24 step
25 step
26 step

The invention claimed is:

1. A method for operating a parking lock system (10) that is integral with a vehicle transmission, the parking lock system (10) including a parking interlock gear (11) with recesses (16) distributed over a circumference of the parking interlock gear (11), each of the recesses (16) delimited by a side (18) situated at a front and a side (19) situated at a rear as viewed in a particular direction of rotation (17) of the parking interlock gear (11), the parking lock system (10) also including a parking pawl (12) insertable with an insertion section (20) in a respective one of the recesses (16) of the parking interlock gear (11) in order to interlock a shaft coupled to the parking interlock gear (11) and prevent rotation of the shaft in both rotational directions of the shaft, the parking lock system (10) also including a parking lock actuator (13) for the parking pawl (12) and a parking lock sensor (14) configured for detecting an absolute rotation angle position of the parking interlock gear (11), the method comprising:

actuating the parking pawl (12) with the parking lock actuator (13) in order to engage the parking lock system (10);

detecting the absolute rotation angle position of the parking interlock gear (11);

comparing the detected absolute rotation angle position with a reference rotation angle position; and when the detected absolute rotation angle position is situated behind the reference rotation angle position as viewed in the particular direction of rotation of the parking interlock gear (11), detecting a rattling process of the parking pawl (12) after actuating the parking pawl (12), wherein the rattling process of the parking pawl (12) corresponds to a condition of the parking pawl (12) when the parking lock actuator (13) for the parking pawl (12) actuates the parking pawl (12) towards the parking interlock gear (11) while a rotational speed of the parking interlock gear (11) is greater than a limit value.

2. The method of claim 1, wherein the reference rotation angle position corresponds to a next rotation angle position of the parking interlock gear (11) in the particular direction of rotation of the parking interlock gear (11) at which one side of the insertion section (20) of the parking pawl (12) is restable against one of the corresponding front and rear sides of a next recess (16) of the recesses (16) of the parking interlock gear in the particular direction of rotation.

3. The method of claim 2, wherein the reference rotation angle position corresponds to the next rotation angle position of the parking interlock gear in the particular direction of rotation at which a front side of the insertion section (20), as viewed in the particular direction of rotation, is restable against the rear side, as viewed in the particular direction of rotation, of the next recess (16) of the parking interlock gear in the particular direction of rotation.

4. The method of claim 1, wherein:

detecting the absolute rotation angle position of the parking interlock gear (11) comprises detecting a first absolute rotation angle position of the parking interlock gear (11) when the insertion section (20) of the parking pawl (12) is insertable into one of the recesses (16) of the parking interlock gear (11) alone or exclusively as a result of the actuation of the parking pawl (12), and subsequently, detecting at least one second absolute rotation angle position of the parking interlock gear (11); and the method further comprising comparing each of the at least one second absolute rotation angle position of the parking interlock gear (11) with the reference rotation angle position that, relative to the first absolute rotation angle position as viewed in the particular direction of rotation of the parking interlock gear (11), corresponds to a next rotation angle position of the parking interlock gear (11) in the particular direction of rotation and at which a side of the insertion section (20) of the parking pawl (12) situated at the front of one of the recesses (16), in the particular direction of rotation of the parking interlock gear (11), is restable against the side of the one of the recesses (16) of the parking interlock gear (11) situated at the rear of the one of the recesses (16) in the particular direction of rotation of the parking interlock gear (11); and wherein detecting the rattling process of the parking pawl (12) comprises detecting the rattling process of the parking pawl (12) when the at least one second absolute rotation angle position is situated behind the reference rotation angle position as viewed in the particular direction of rotation of the parking interlock gear (11).

5. A control unit of a motor vehicle including the vehicle transmission with the parking lock system (10), the control unit configured for implementing the method of claim 1.

6. The method of claim 1, wherein the parking lock sensor (14) is positioned opposite the parking pawl (12) about the parking interlock gear (11).

7. A control unit of a motor vehicle including a transmission with a parking lock system (10) that is integral with the transmission, the parking lock system (10) including a parking interlock gear (11) with recesses (16) distributed over a circumference of the parking interlock gear (11), a parking pawl (12) insertable with an insertion section (20) in a respective one of the recesses (16) of the parking interlock gear (11) in order to interlock a shaft coupled to the parking interlock gear (11) and prevent rotation of the shaft in both rotational directions of the shaft, a parking lock actuator (13) for the parking pawl (12), and a parking lock sensor (14) configured for detecting an absolute rotation angle position of the parking interlock gear (11), the control unit configured for:

actuating the parking pawl (12) with the parking lock actuator (13) in order to engage the parking lock system (10);

receiving the absolute rotation angle position of the parking interlock gear (11) from the parking lock sensor (14);

comparing the absolute rotation angle position with a reference rotation angle position; and when the absolute rotation angle position is situated behind the reference rotation angle position as viewed in a direction of rotation of the parking interlock gear (11), detecting a rattling process of the parking pawl (12) after actuating the parking pawl (12), wherein the rattling process of the parking pawl (12) corresponds to a condition of the parking pawl (12) when the parking lock actuator (13) for the parking pawl (12) actuates the parking pawl (12) towards the parking interlock gear (11) while a rotational speed of the parking interlock gear (11) is greater than a limit value.

8. A method for operating a parking lock system (10) that is integral with a transmission, the parking lock system (10) including a parking interlock gear (11) with recesses (16) distributed over a circumference of the parking interlock gear (11), each of the recesses (16) delimited by a side (18) situated at a front and a side (19) situated at a rear as viewed in a particular direction of rotation (17) of the parking interlock gear (11), the parking lock system (10) also including a parking pawl (12) insertable with an insertion section (20) in a respective one of the recesses (16) of the parking interlock gear (11) in order to interlock the parking interlock gear (11), the parking lock system (10) also including a parking lock actuator (13) for the parking pawl (12) and a parking lock sensor (14) configured for detecting an absolute rotation angle position of the parking interlock gear (11), the method comprising:

- actuating the parking pawl (12) with the parking lock actuator (13) in order to engage the parking lock system (10);
- detecting the absolute rotation angle position of the parking interlock gear (11);
- comparing the detected absolute rotation angle position with a reference rotation angle position; and
- when the detected absolute rotation angle position is situated behind the reference rotation angle position as viewed in the particular direction of rotation of the parking interlock gear (11), detecting a rattling process of the parking pawl (12) after actuating the parking pawl (12),
- wherein the rattling process of the parking pawl (12) corresponds to a condition of the parking pawl (12) when the parking lock actuator (13) for the parking pawl (12) actuates the parking pawl (12) towards the parking interlock gear (11) while a rotational speed of the parking interlock gear (11) is greater than a limit value.

* * * * *